(12) United States Patent
Wells et al.

(10) Patent No.: US 10,933,933 B2
(45) Date of Patent: Mar. 2, 2021

(54) AUTONOMOUS VEHICLE GUIDANCE SYSTEM AND METHOD

(71) Applicant: GM Global Technology Operations LLC, Detroit, MI (US)

(72) Inventors: James W. Wells, Rochester Hills, MI (US); Neil D. McKay, Chelsea, MI (US); Seog-Chan Oh, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 208 days.

(21) Appl. No.: 16/179,086

(22) Filed: Nov. 2, 2018

(65) Prior Publication Data

US 2020/0140028 A1 May 7, 2020

(51) Int. Cl.
| | |
|---|---|
| *B62D 65/02* | (2006.01) |
| *G05D 1/02* | (2020.01) |
| *G05D 1/00* | (2006.01) |
| *B60L 53/12* | (2019.01) |
| *B60L 50/50* | (2019.01) |

(52) U.S. Cl.
CPC ............ *B62D 65/022* (2013.01); *B60L 53/12* (2019.02); *G05D 1/0088* (2013.01); *G05D 1/0225* (2013.01); *G05D 1/0248* (2013.01); *G05D 1/0276* (2013.01); *B60L 50/50* (2019.02); *B60L 2230/14* (2013.01); *B60L 2260/32* (2013.01); *B60Y 2200/91* (2013.01)

(58) Field of Classification Search
CPC ....... B62D 65/022; B62D 65/18; B60L 53/12; B60L 50/50; B60L 2230/14; B60L 2260/32; G05D 1/0248; G05D 1/0276; G05D 1/0225; G05D 1/0088; B60Y 2200/91

USPC .......................................................... 701/27
See application file for complete search history.

(56) References Cited

U.S. PATENT DOCUMENTS

| | | | | |
|---|---|---|---|---|
| 9,387,756 | B1* | 7/2016 | Whiting | B60K 6/52 |
| 2005/0212491 | A1* | 9/2005 | Colombo | H02J 7/0032 |
| | | | | 320/150 |
| 2012/0239224 | A1* | 9/2012 | McCabe | G05D 1/0297 |
| | | | | 701/2 |
| 2012/0239238 | A1 | 9/2012 | Harvey et al. | |
| 2013/0282168 | A1* | 10/2013 | Yokota | B62D 65/18 |
| | | | | 700/230 |

(Continued)

FOREIGN PATENT DOCUMENTS

CN 201310197649 A 9/2013

*Primary Examiner* — Jonathan M Dager
*Assistant Examiner* — Jean W Charleston
(74) *Attorney, Agent, or Firm* — Quinn IP Law (57) ABSTRACT

An autonomous vehicle guidance system enables a partially assembled battery-electric vehicle (BEV) to be guided through an assembly process with the temporary addition of a sensor skid. The partially assembled BEV includes a vehicle body, a vehicle controller coupled to the vehicle body, a battery electrically coupled to the vehicle controller, a sensor skid configured to be coupled under the vehicle body of the BEV. The sensor skid is configured to guide the BEV through an assembly process. The sensor skid includes a skid body configured to be coupled under the vehicle body of the BEV and a plurality of sensors coupled to the skid body. The sensor skid includes a skid controller in communication with the sensors and the vehicle controller. The skid controller is coupled to the sensor skid.

20 Claims, 7 Drawing Sheets (56) References Cited

U.S. PATENT DOCUMENTS

| | | | |
|---|---|---|---|
| 2015/0073631 A1* | 3/2015 | Lim | G01C 21/34 701/22 |
| 2015/0375791 A1* | 12/2015 | Vijayakumar | C23C 18/54 296/193.07 |
| 2017/0327000 A1* | 11/2017 | Wada | B60K 17/356 |
| 2017/0369100 A1* | 12/2017 | Higuchi | F16H 7/1254 |
| 2018/0032955 A1* | 2/2018 | Lindawati | G06Q 10/08355 |
| 2018/0065242 A1* | 3/2018 | Tanaka | B60L 53/80 |
| 2018/0123361 A1* | 5/2018 | Gray | H02J 7/0022 |
| 2018/0273243 A1* | 9/2018 | Kilibarda | B23K 37/047 |
| 2018/0290551 A1* | 10/2018 | Jones | B60L 53/124 |

\* cited by examiner

AUTONOMOUS VEHICLE GUIDANCE SYSTEM AND METHOD

INTRODUCTION

The present disclosure relates to vehicle assembly and service. In particular, the present disclosure relates to an autonomous vehicle guidance system and method.

Vehicles, such as cars, are usually assembled in a manufacturing plant by following an assembly process. It is desirable to maximize the flexibility of the vehicle assembly process in terms of model mix, scheduling and volume. It is also desirable to develop a vehicle assembly process that is not dependent on a conveyor system to maximize the flexibility of the assembly process.

SUMMARY

The present disclosure describes an autonomous vehicle guidance system that enables a partially assembled battery-electric vehicle (BEV) to be guided through an assembly process with the temporary addition of a sensor skid. The sensor skid, which is located under the vehicle, controls and guides the powered rolling vehicle body based on local sensing and communication to high level planning/scheduling software. The sensor skid is attached temporarily to the vehicle body and is configured to be easily removed at the end of the assembly. By using the sensor skid, the assembly process control is not dependent on a fixed configuration conveyor system, thereby allowing real-time re-routing and adjusting.

In an aspect of the present disclosure, the autonomous vehicle guidance system includes a partially assembled BEV. The partially assembled BEV includes a vehicle body, a vehicle controller coupled to the vehicle body, a battery electrically coupled to the vehicle controller, and a sensor skid configured to be coupled under the vehicle body of the BEV. The sensor skid is configured to guide the BEV through an assembly process. The sensor skid includes a skid body configured to be coupled under the vehicle body of the BEV, and also includes a plurality of sensors coupled to the skid body. Each of the plurality of sensors is configured to detect objects around the BEV. The sensor skid further includes a skid controller in communication with the plurality of sensors and the vehicle controller. The skid controller may be coupled to the sensor skid and is programmed to communicate with the vehicle controller to guide a movement of the BEV based on data received from the plurality of sensors. The plurality of sensors may include a camera configured to capture images of areas around the partially assembled BEV. The plurality of sensor may include a laser projector configured to project lasers around the partially assembled BEV. The plurality of sensors includes a plurality of laser range scanners to detect obstacles around the partially assembled BEV. The autonomous vehicle guidance system may further include a plurality of pins coupled to the sensor skid. Each of the plurality of pins is configured to engage the vehicle body of the partially assembled BEV in order to couple the sensor skid to the BEV. The autonomous vehicle guidance system further includes a plurality of wheels coupled to the sensor skid to facilitate movement of the sensor skid. In some embodiments, the autonomous vehicle guidance system further includes a skid transceiver coupled to the skid body. The skid transceiver is coupled to the skid controller to establish a wireless communication between the skid controller and a coordination server, and the autonomous vehicle guidance system further includes an electrical energy receiver configured to receive energy from an opportunity charging station. The opportunity charging station may be a wireless inductive charging station or other means of conductive charging.

The present disclosure also relates to an autonomous vehicle guidance method. This method includes mechanically and electrically coupling a sensor skid to a partially assembled battery-electric vehicle (BEV); syncing the skid controller with the vehicle controller; sending, by the skid controller, a message to a coordination server, wherein the message indicates that the partially assembled BEV is ready for an operation; in response to receiving the message, the coordination server responds with a list of available work stations; determining a target work station of the list of available work stations; and in response to determining the target work station, commanding the partially assembled BEV to move toward the target work station. The target work station is determined through an agent-based communication, real time and dynamic job dispatching. The target work station is determined by using an adaptive vehicle sequencing multi-variable algorithm. The vehicle production sequence is determined genetic algorithm based heuristic simulation optimization method. The sensor skid includes a Wi-Fi transceiver coupled to the sensor skid. The Wi-Fi transceiver is coupled to the skid controller to establish a wireless communication between the skid controller and the coordination server.

The above features and advantages and other features and advantages of the present teachings are readily apparent from the following detailed description of the best modes for carrying out the teachings when taken in connection with the accompanying drawings.

DETAILED DESCRIPTION

Figure 1:
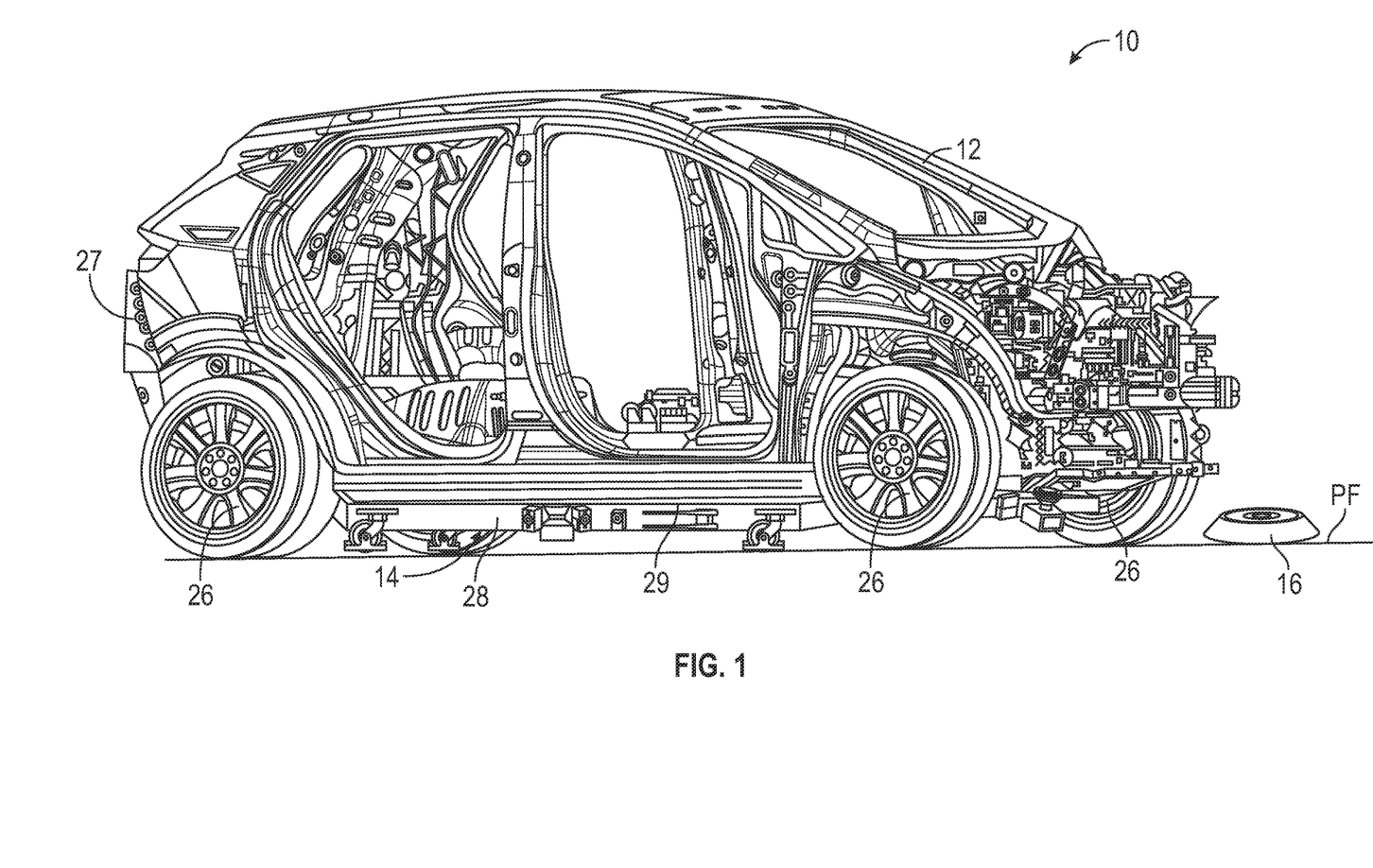
FIG. 1 is a schematic, perspective view of an autonomous vehicle guidance system including a sensor skid and a partially assembled battery electric vehicle (BEV).
Figure 2:
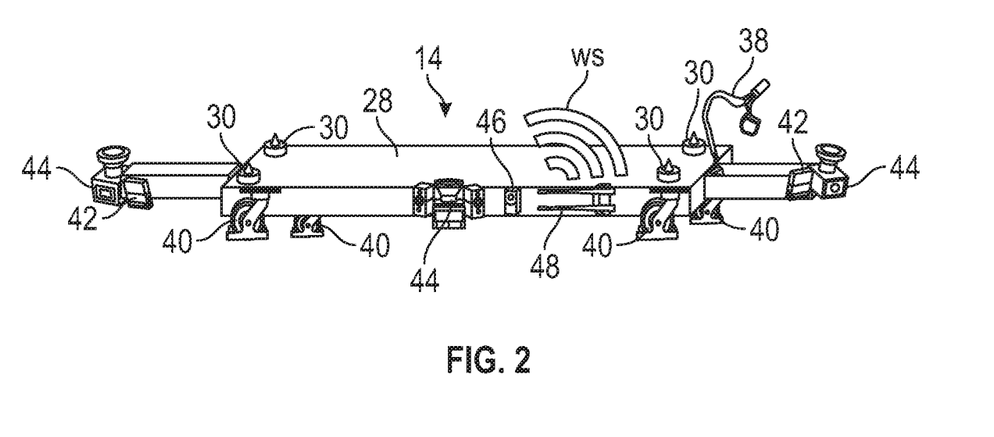
FIG. 2 is a schematic, perspective view of the sensor skid of the autonomous vehicle guidance system of FIG. 1.
Figure 3:
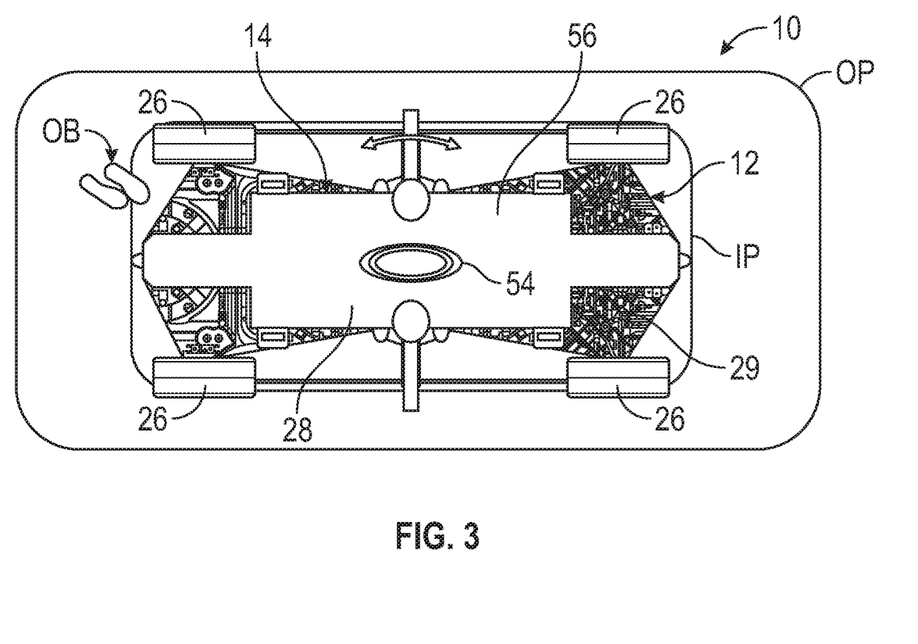
FIG. 3 is a schematic, bottom view of the sensor skid and the partially assembled vehicle of the autonomous vehicle guidance system of FIG. 1.

Referring to the drawings, wherein like reference numbers correspond to like or similar components throughout the several figures, and beginning with FIGS. 1, 2, and 3, an autonomous vehicle guidance system 10 includes a partially assembled battery electric vehicle (BEV) 12, a sensor skid 14, and one or more opportunity charging stations 16 for electrically charging the BEV 12 and/or the sensor skid 14. The opportunity charging stations 16 may be wireless inductive and/or conductive charging stations. The opportunity charging stations 16 are disposed on a plant floor PF and may be located at buffers area or charging stations. The partially assembled BEV 12 is a partially assembled autonomous vehicle and includes a steering assembly 18 for steering the partially assembled BEV, a propulsion system 20 for propelling the BEV 12, a vehicle battery 22 for supplying electricity to, among other things, the propulsion system 20, and a vehicle controller 24 for controlling the steering assembly 18 and the propulsion system 20. The term "controller" means a physical device including hardware elements such as a processor (P), circuitry including but not limited to a timer, oscillator, analog-to-digital (A/D) circuitry, digital-to-analog (D/A) circuitry, a digital signal processor, and suitable input/output (I/O) devices and other signal conditioning and/or buffer circuitry. The memory (M) may include tangible, non-transitory memory such as read-only memory (ROM), e.g., magnetic, solid-state/flash, and/or optical memory, as well as sufficient amounts of random access memory (RAM), electrically-erasable programmable read-only memory (EEPROM), and the like. The methods described in the present disclosure may be recorded in memory (M) and executed by the processor (P) in the overall control of the autonomous vehicle guidance system 10. The vehicle controller 24 is in electronic communication with the steering assembly 18 and the propulsion system 20, allowing the vehicle controller 24 to control the steering assembly 18 and the propulsion system 20. The autonomous vehicle guidance system 10 leverages the steering assembly 18 and propulsion system 20 of the partially assembled BEV 12 to autonomously transport through the assembly process without the need of conveyor systems.

The steering assembly 18 is configured to steer the partially assembled BEV 12 in a desired direction and may include, for example, a rack-and-pinion assembly coupled to the vehicle wheels 26 of the partially assembly BEV 12. As such, the steering assembly 18 can turn at least some of the vehicle wheels 26 of the partially assembled BEV 12 for steering. The steering direction is controlled by the vehicle controller 24. Thus, the vehicle controller 24 is programmed to command the steering assembly 18 to turn the vehicle wheels 26 in a desired direction to steer the partially assembled BEV 12. The partially assembled BEV 12 further includes a vehicle body 27 coupled to the vehicle wheels 26.

In addition to the steering assembly 18, the partially assembled BEV 12 includes the propulsion system 20. The propulsion system 20 includes one or more electric motors configured to receive electric power from the vehicle battery 22. Upon receipt of electricity from the vehicle battery 22, the propulsion system 20 converts the electrical power into mechanical power (i.e., torque) to propel the partially assembled BEV 12. The vehicle battery 22 may include one single battery or may be a battery pack including a plurality of battery cells. Regardless, the vehicle battery 22 is capable of storing electrical energy and is electrically connected to the propulsion system 20. Consequently, the vehicle battery 22 is configured to provide electricity to the propulsion system 20. The vehicle battery 22 may also be electrically connected to the vehicle controller 24. As such, the vehicle battery 22 is configured to provide electricity to the vehicle controller 24. If the steering assembly 18 is a steer-by-wire system, the vehicle battery 22 is electrically connected to the steering assembly 18 and therefore provides electrical power to the steering assembly 18. The partially assembled BEV 12 may also include a vehicle transceiver 31 configured to establish a wireless communication with the sensor skid 14, infrastructure, work stations, adjacent vehicles, and a coordination server 50 through a wireless network 52.

As mentioned above, the autonomous vehicle guidance system 10 further includes the sensor skid 14 configured to detect objects around the partially assembled BEV 12. The sensor skid 14 includes a skid body 28 configured to be physically coupled under the partially assembled BEV 12. The skid body 28 may be substantially planar to facilitate connection to an underbody 29 of the vehicle body 27 of the partially assembled BEV 12. The sensor skid 14 further includes a plurality of pins 30 coupled to the skid body 28 to facilitate a temporary connection of the sensor skid 14 to the underbody 29 of the vehicle body 27. Each of the plurality of pins 30 may be configured as tow pins that engage locator holes in the underbody 29 of the vehicle body 27. As such, the sensor skid 14 is towed or lifted by pin clamps for retention to the partially assembled BEV 12. Therefore, the sensor skid 14 is configured to be removably coupled to the partially assembled BEV 12.

As discussed in detail below, the sensor skid 14 includes a plurality of sensors 32 for detecting objects around the partially assembled BEV 12. The sensor skid 14 further includes a skid controller 34 in communication with the sensors 32. The sensors 32 are configured to generate sensing data relating to the objects around the partially assembled BEV 12. Therefore, the skid controller 34 is programmed to receive sensing data from the sensors 32. The skid controller 34 is programmed to guide the movement of the partially assembled BEV 12 based on the sensing data received from the sensors 32.

The sensor skid 14 further includes a skid battery 36 or another energy-storage device capable of storing electrical energy. The skid battery 36 may include one single battery or may be a battery pack including a plurality of battery cells. In the depicted embodiment, the skid battery 36 is electrically connected to skid controller 34 and the sensors 32. As such, the skid battery 36 may supply electricity to the skid controller 34 and the sensors 32. It is envisioned that the skid battery 36 may function as a power supply that supplies electricity solely when the vehicle battery 22 fails. Therefore, the vehicle battery 22 may be electrically connected to the skid controller 34 and the sensors 32. To this end, the sensor skid 14 includes a power connection coupler 38 to electrically connect the vehicle battery 22 to the sensors 32 and the skid controller 34. The power connection coupler 38 is also configured to allow data transfer between the skid controller 34 and the vehicle controller 24. For example, the skid controller 34 is programmed to monitor (through the vehicle controller 24) the state of charge of the vehicle battery 22 to schedule opportunity charging with the coordination server 50.

As discussed above, the autonomous vehicle guidance system 10 includes opportunity charging stations 16 to charge the vehicle battery and/or the skid battery 36. The sensor skid 14 further includes an energy receiver 54, such as an inductive coil, configured to receive energy from the opportunity charging stations 16 to charge the vehicle battery 22 and/or the skid battery 36. The opportunity charging stations 16 may charge the vehicle battery 22 and/or the skid battery 36 through wireless inductive charging. The energy receiver 54 may be coupled to an underside 56 of the skid body 28 to facilite energy transfer between one of the opportunity charging stations 16 (which are disposed on the plant floor PF) and the vehicle battery 22 and/or the skid battery 36.

The sensor skid 14 includes a plurality of skid wheels 40 coupled to the skid body 28 to transport the sensor skid 14 for coupling with the partially assembled BEV 12. The skid wheels 40 may also facilitate movement of the sensor skid 14 to return to the beginning of the assembly process after the sensor skid 14 has been decoupled from the partially assembled BEV 12. The skid wheels 40 may be configured as dolly wheels. It is contemplated that the sensor skid 14 may be manually returned to the beginning of the assembly process. The sensor skid 14 does not necessarily include its own propulsion system, but rather relies on the propulsion system 20 of the the partially assembled BEV 12 for propulsion. To this end, the skid controller 34 is in communication with the vehicle controller 24 and is programmed to control the propulsion system 20 and the steering assembly 18 of the partially assembled BEV 12 via the vehicle controller 24.

The sensors 32 of the sensor skid 14 may include one or more cameras 42 each configured to capture images of areas around the partially assembled BEV 12. The cameras 42 watch for cues from operator foot placement around the partially assembled BEV 12. In addition, the cameras 42 capture images to determine the location of the partially assembled BEV 12 along an assembly route. Further, the cameras 42 captures images of ID tags of the work stations along the assembly route. The cameras 42 are in communication with the skid controller 34. Therefore, the skid controller 34 is programmed to receive image data from the cameras 42. The skid controller 34 is also programmed to determine the location of the partially assembled BEV 12 based on the image data received from the cameras 42.

The sensors 32 further include one or more laser range scanners 44 coupled to the skid body 28 and configured to detect objects around the partially assembled BEV 12 as well as the distance from the partially assembled BEV 12 to those detected objects. For example, the laser range scanners 44 may be used to establish a virtual bumper to detect when objects or operators are within a predetermined distance from the partially assembled BEV 12. The laser range scanners 44 are configured to generate laser-sensing data and send the laser-sensing data to the skid controller 34. The skid controller 34 is programmed to receive the laser-sensing data and guide the partially assembled BEV 12 based on the laser-sensing data received from the laser range scanners 44. For instance, if the skid controller 34 detects an object and/or an operator within the virtual bumper based on the laser-sensing data received from the laser range scanners 44, then the skid controller 34 commands the partially assembled BEV 12 to stop to avoid contact with the detected object or operator. The sensor skid 14 further includes one or more laser projectors 46 configured to project a visible light onto the plant floor PF to establish the virtual bumper. As such, operators may have a visible indication of the virtual bumper and avoid the virtual bumper. The laser projectors 46 may be controlled by the skid controller 34 to have different vehicle motion indication modes with color and/or temporal patterns projected on the plant floor PF around a predetermined inner perimeter IP and/or predetermined outer perimeter OP around the partially assembled BEV 12. The virtual bumper may be, for example, defined by the predetermined inner perimeter IP. The footprint of the sensor skid 14 allows foot space for working closely around the partially assembled BEV 12. However, if the laser range scanners 44 detect an obstacle OB, such as object and/or operator, within the predetermine inner perimeter IP, then the skid controller 34 commands the partially assembled BEV 12 to stop (hold its position) until the obstacle is no longer within the predetermined inner perimeter IP. It is envisioned that the skid controller 34 may activate an alarm or warning if an obstacle OB is within the predetermined outer perimeter OP. This may also be accompanied with an annunciation of the area of the obstacle OB by one or more of the laser projectors 46.

Figure 4:
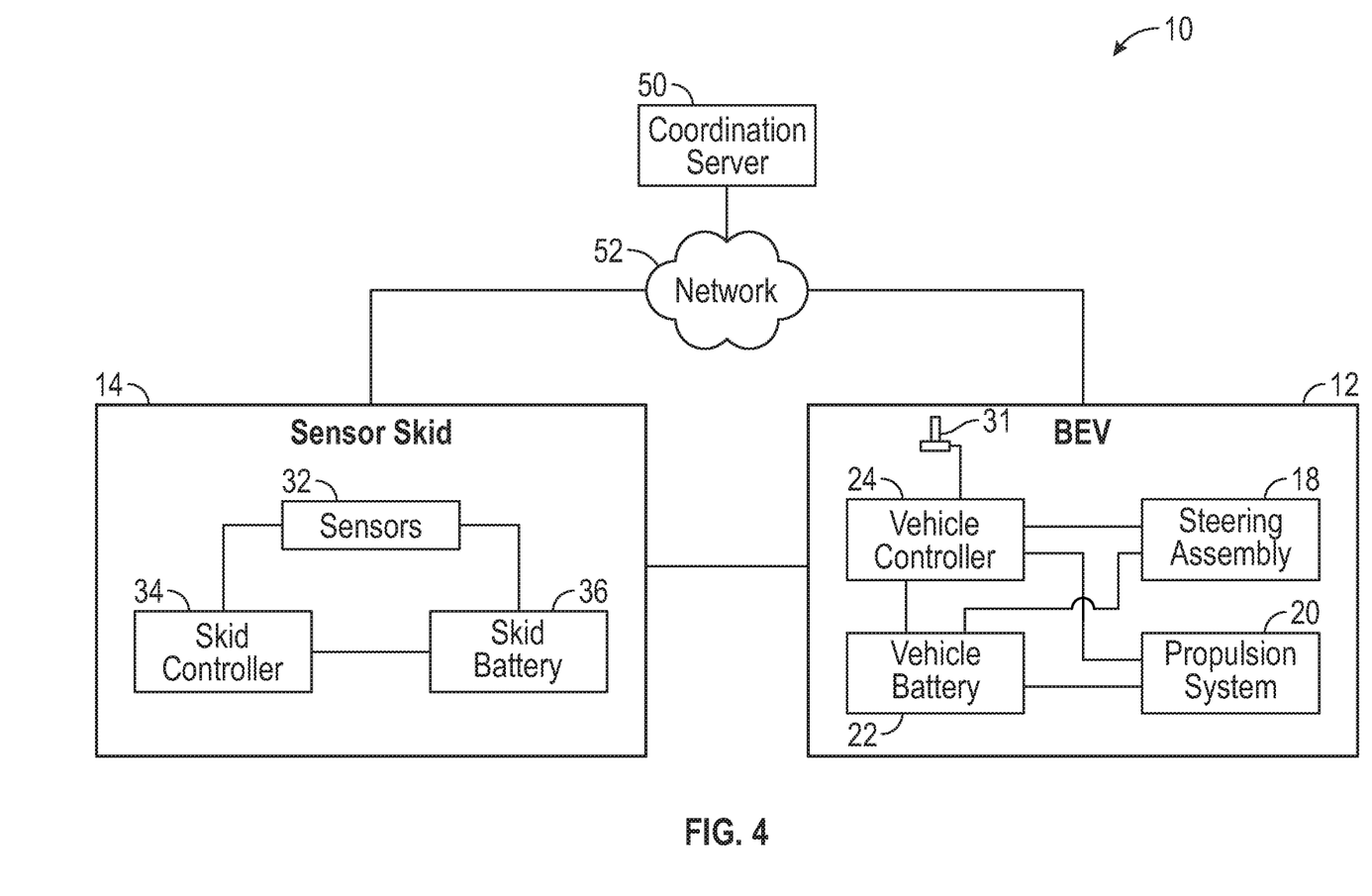
FIG. 4 is a block diagram of the autonomous vehicle guidance system, further illustrating a coordination server and a network for establishing communication among the coordination server, the partially assembled BEV, and the sensor skid.

The sensor skid 14 further includes a skid transceiver 48 configured to establish a wireless communication between the skid controller 34 and a work station, adjacent vehicles, the vehicle controller 24, infrastructure, and/or the coordination server 50. The skid transceiver 48 is coupled to the skid controller 34 and may be capable of multichannel wireless communication and can therefore transmit and receive wireless signals WS though the network 52, thereby allowing transfer of wireless data for control and scheduling. For example, the wireless data transfer allows the sensor skid 14 to communicate with the coordination server 50, which runs algorithms that supervise the assembly process and overall operation of the autonomous vehicle guidance system 10. The scheduling and/or routing of the partially assembled BEV 12 is adapted to the material and production conditions stored in the coordination server 50. The skid controller 34 is capable of autonomously navigating the partially assembled BEV 12 through the assembly process or to a commanded location received from the coordination server 50. The coordination server 50 is programmed with a scheduling algorithm that enables dynamic allocation of the partially assembled BEVs 12 to a matrix of work stations. Consequently, the routing process is flexible and is not tied to an in-line conveyor centric system. The coordination server 50 is in communication with the skid controller 34 and is programmed to schedule the movement of the partially assembled BEV 12 via the skid controller 34.

Figure 5A:
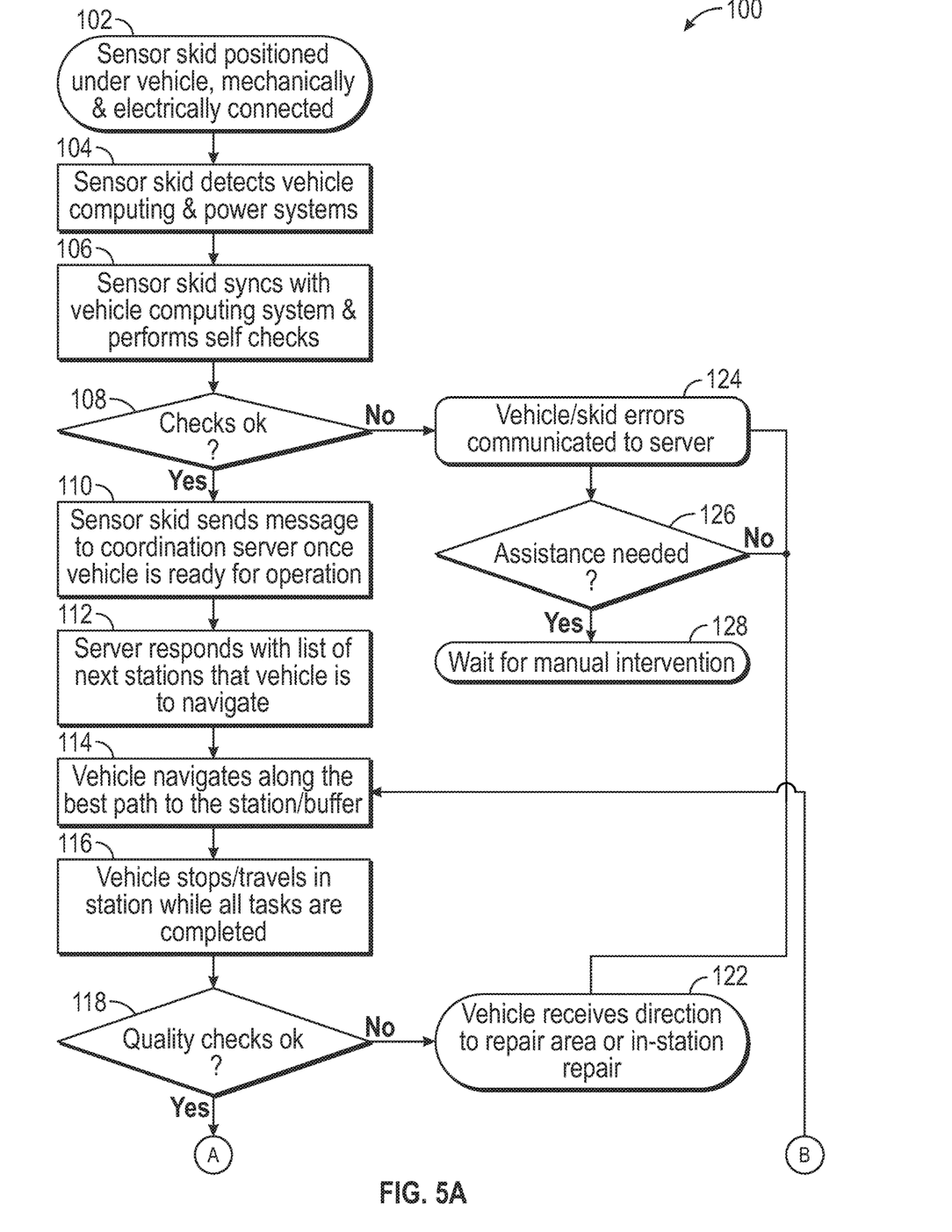
FIG. 5A is a portion of a flowchart of a method for operating the sensor skid.
Figure 5B:
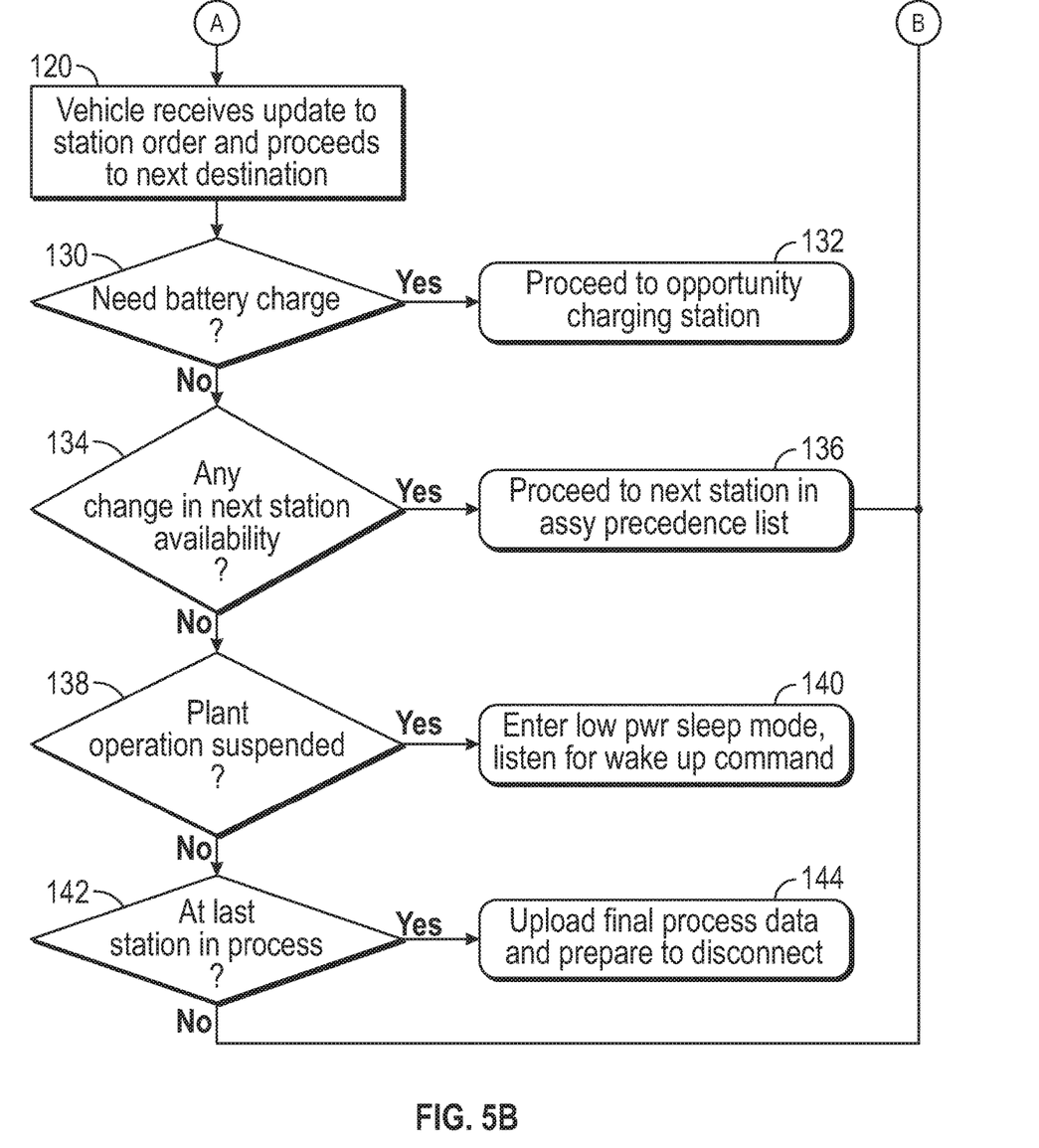
FIG. 5B is another portion of a flowchart of a method for operating the sensor skid.

FIG. 5A and FIG. 5B illustrate a flowchart of a method 100 for operating the sensor skid 14. The operating method 100 begins at block 102, in which the sensor skid 14 is positioned under the partially assembled BEV 12 and mechanically and electrically coupled to the partially assembled BEV 12. Then, the operating method 100 proceeds to block 104. At block 104, the sensor skid 14 detects the vehicle computing and power systems (e.g., the vehicle controller 24, the propulsion system 20, and/or the vehicle battery 22). Specifically, at block 104, the skid controller 34 detects the vehicle controller 24, the propulsion system 20, the steering assembly 18, and/or the vehicle battery 22. Then, the operating method 100 proceeds to block 106. At block 106, the sensor skid 14, via the skid controller 34, syncs with the vehicle computing system (e.g., the vehicle controller 24) and performs self-checks to determine whether the vehicle controller 24 and/or the skid controller 34 are operating according to predetermined operational conditions. Then, the operating method 100 proceeds to block 108. At block 108, the skid controller 34 determines whether checks are okay (i.e., in accordance with predetermined parameters), thereby indicating that the sensor skid 14 and the partially assembled BEV 12 is ready for operation. If the checks are okay, then the operating method 100 proceeds to block 110. At block 110, the sensor skid 14 (via the skid controller 34) sends a message to the coordination server 50. The message indicates that the partially assembled BEV 12 is ready for operation.

In response to receiving the message, at block 112, the coordination server 50 responds with a list of available work stations for the next operation on the partially assembled BEV 12. In other words, at block 112, the coordination server 50 responds with a list of next work stations that the partially assembled BEV 12 may navigate to. Then, the operating method 100 continues to block 114. At block 114, the coordination server 50, the vehicle controller 24 and/or the skid controller 34 determines a target work station or buffer area of the list of available work stations based on the best path (i.e., most optimal path) along the assembly route. Also at block 114, the vehicle controller 24 and/or the skid controller 34 commands the partially assembled BEV 12 to navigate to the target work or buffer area along the optimal path along the assembly route. Then, the operating method 100 proceeds to block 116. At block 116, in response to receiving the command, the partially assembled BEV 12 travels to the work station while the tasks on that work station are completed. If the partially assembled BEV 12 travels to a buffer area, then the partially assembled BEV 12 stops once it reaches the buffer zone until all tasks at the next work station are completed. Once all the tasks at the next work station are completed, the partially assembled BEV 12 travels to that next work station.

Next, the operating method 100 proceeds to block 118. At block 118, the vehicle controller 24, the coordination server 50 and/or the skid controller 34 performs quality check on the tasks performed at the work station. Also at block 118, the vehicle controller 24, the coordination server 50 and/or the skid controller 34 determines whether the tasks performed pass the quality checks. If the tasks performed at the work station passed the quality checks, there the operating method 100 proceeds to block 120. If the tasks performed at the work station do not pass the quality checks, then the operating method 100 continues to block 122. At block 122, the vehicle controller 24 receives directions to a repair area from the coordination server 50. Alternatively, at block 122, the coordination server 50 commands the vehicle controller 24 to stay in place to conduct an in-station repair.

Returning to block 108, if the checks are not okay, then the operating method 100 proceeds to block 124. At block 110, the errors (which may relate to the partially assembled BEV 12 and/or the sensor skid 14) are communicated to the coordination server 50. Then, the operating method 100 proceeds to block 126. At block 126, the coordination server 50 asks the operator if assistance is needed. If the operators respond that assistance is needed, then the operating method 100 proceeds to block 128. At block 128, the coordination server 50 stops the assembly process and waits for manual intervention. If it is determined at block 126 that no assistance is needed, then the operating method 100 returns to block 124.

Returning to block 120, at this block, the partially assembled BEV 12 (via the vehicle controller 24) receives updates from the coordination server 50 regarding the work station order to determine the next target work station. Then, the vehicle controller 24 commands the partially assembled BEV 12 to travel to the next work station. In response, the partially assembled BEV 12 proceeds to the next work station and/or buffer area (i.e., the next destination). Then, the operating method 100 continues to block 130. At block 130, the skid controller 34 determines whether the vehicle battery 22 needs to be charged. As discussed above, the skid controller 34 monitors the state of charge of the vehicle battery 22. Thus, if the state of charge of the vehicle battery 22 falls below a predetermined threshold, then the skid controller 34 determines that the vehicle battery 22 needs to be charged. If the vehicle battery 22 needs to be charged, the operating method 100 proceeds to block 132. At block 132, the skid controller 34 commands the partially assembled BEV 12 to travel to the closest the opportunity charging station 16. In response, the partially assembled BEV 12 moves to the closest opportunity charging station 16 to charge the vehicle battery 22. If the vehicle battery 22 does not need to be charged, the operating method 100 proceeds to block 134. At block 134, the coordination server 50 determines whether there is any change in the next target work station availability. If there is any change in the next target work station availability, then the operating method 100 proceeds to block 136.

At block 136, the coordination server 50 communicates to the skid controller 34 that the partially assembled BEV 12 should go to the next work station in the assembly precedent list. In response, the skid controller 34 commands the partially assembled BEV 12 to move to the next work station in the assembly precedent list. However, if at block 134, the coordination server 50 determines that there is no change in the next work station availability, then the operating method 100 proceeds to block 138. At block 138, the coordination server 50 determines whether the plant operation is suspended. If the plant operation is suspended, then the operating method 100 continues to block 140. At block 140, skid controller 34 enters into power sleep mode and listens for a wake-up command from the coordination server 50. If, at block 138, the coordination server 50 determines that the plant operation is not suspended, then the operating method 100 continues to block 142. At block 142, the skid controller 34 determines whether the partially assembled BEV 12 is at the last work station of the assembly process. If the partially assembled BEV 12 is not located at the last work station of the assembly process, then the operating method 100 returns to block 136. If the partially assembled BEV 12 is at the last work station of the assembly process, then the operating method 100 proceeds to block 144. At block 144, the skid controller 34 uploads the final process data to the coordination server 50 and prepares to disconnect the sensor skid 14 from the BEV 12.

Figure 6:
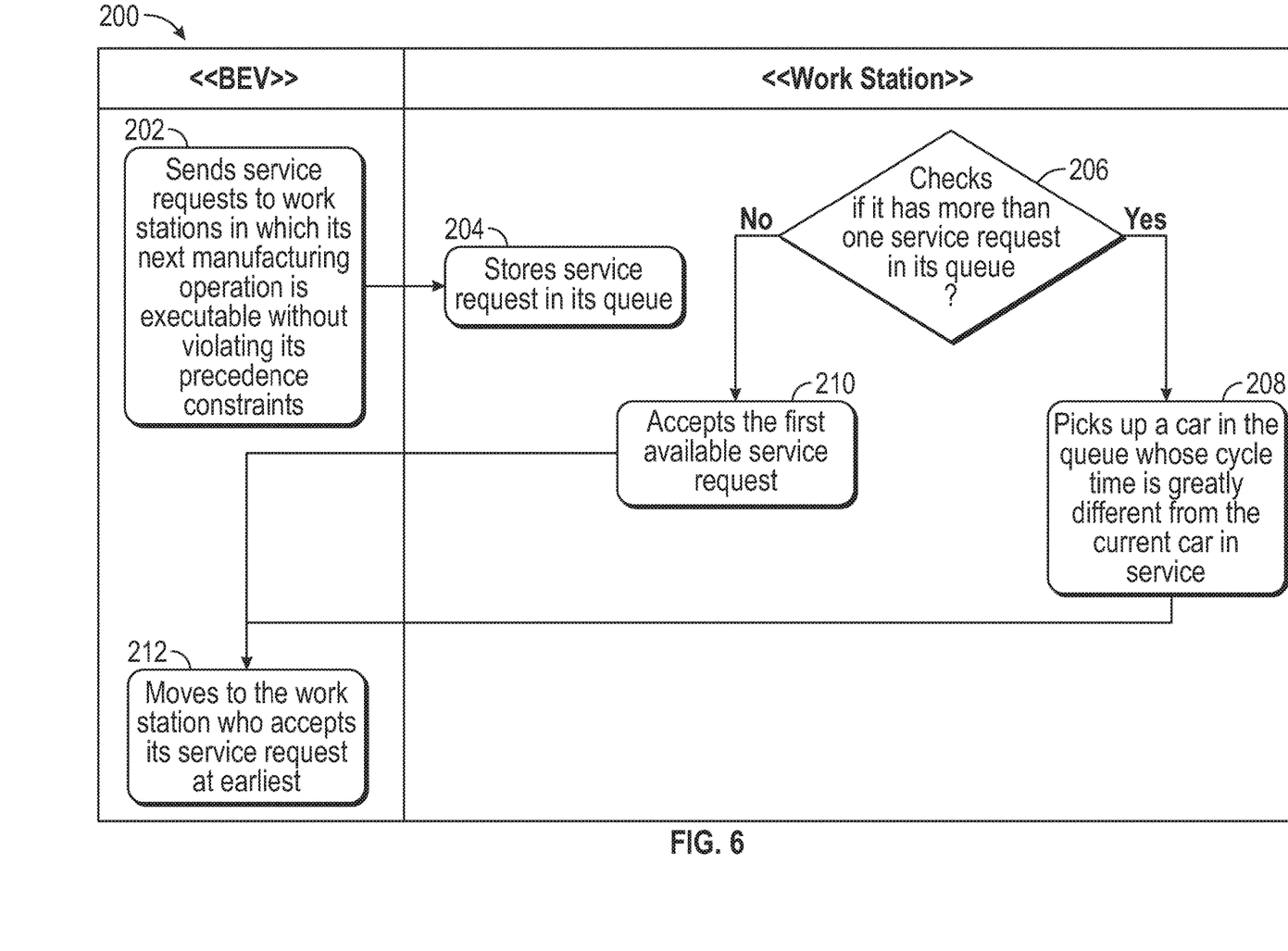
FIG. 6 is a flowchart of an agent-based dynamic job scheduling method using the autonomous vehicle guidance system of FIG. 1.

With reference to FIG. 6, the autonomous vehicle guidance system 10 may be used to maximize the efficiency of a vehicle assembly process by using an agent-based dynamic job scheduling method 200. The scheduling method 200 can be implemented, by using the autonomous vehicle guidance system 10, through agent-based communication, real-time and dynamic job dispatching. The scheduling method 200 employs a heuristic policy in work stations to select the next partially assembled BEV 12 to service. By using this scheduling method 200, a work station selects one among the partially assembled BEV 12 waiting for its service in such a way that the cycle time of the selected BEV 12 has the greatest difference with the currently served BEV 12. This heuristic policy will be effective in balancing the workload through the assembly process, resulting in maximizing the throughput. In particular, the scheduling method 200 selects the next partially assembled BEV 12 to be serviced by a work station using the following equation:

$$\underset{i \in S_j}{\text{Max}}\{C_{(i,j)} - C_{(O_j,j)}\}$$

where:
i is a vehicle in the assembly process;
j is a work station in the assembly process;
$S_j$ is the service request queue of the work station j in the assembly process;
$O_j$ is the vehicle currently being served in work station j;
$C_{(i,j)}$ is the cycle time of a vehicle i in work station j; and
$C_{(O_j,j)}$ is the cycle time of the vehicle currently being served $O_j$ in work station j.

The scheduling method 200 begins at block 202, in which the partially assembled BEV 12 (via the skid controller 34) sends service requests to work stations in which its next manufacturing operation is executable without violating its precedence contraints. Then, the scheduling method 200 continues to block 204. At block 204, the work station stores the service request in its queue.

The scheduling method 200 also includes a block 206, in which the work station determines if it has more than one service request. If the work station has more than one service request, then the scheduling method 200 proceeds to block 208. At block 208, the work station selects the partially assembled BEV 12 whose cycle time is greatly different from the current partially assembled BEV 12 in service by using the equation mentioned above. If the work station does not have more than one service request, then the scheduling method 200 proceeds to block 210. At block 210, the work station accepts the first available service request. Then, the scheduling method 200 proceeds to block 212. At block 212, partially assembled BEV 12 moves to the work station that accepts its service request at the earliest.

In an example of the scheduling method 200, a first partially assembled BEV 12 concurrently sends a service request to a first work station and a second work station, because either the operation in the first work station or operation in the the second work station may be processed in any order according to the first partially assembled BEV 12 precedence graph (i.e., constraints). In this example, the second work station has received service requests from the three partially assembled BEVs 12 (i.e., the first, second, and third partially assembled BEVs 12). The second work station is currently serving a fourth partially assembled BEV and needs to determine the next partially assembled BEV 12 to serve. The second work station will select one among the first, second, and third partially assembled BEVs 12 in such a way that the cycle time of the selected partially assembled BEV has the greatest difference with the cycle time of the fourth partially assembled BEV 12.

Figure 7:
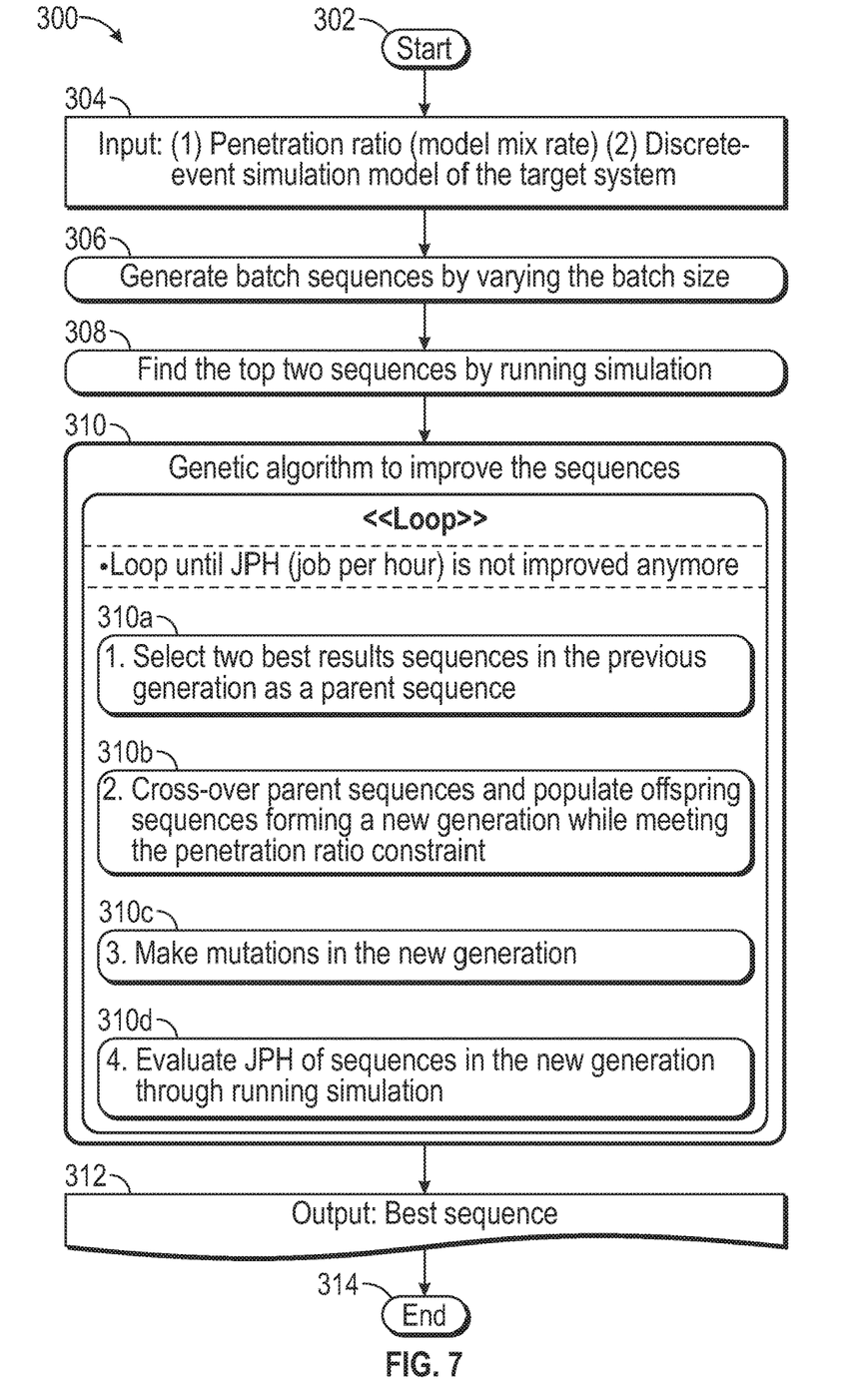
FIG. 7 is a flowchart of a sequence method using the autonomous vehicle guidance system of FIG. 1.

With regards to FIG. 7, the autonomous vehicle guidance system 10 may be used to maximize the efficiency of a vehicle assembly process by using a sequencing method 300. The sequencing method 300 is an adaptive vehicle sequencing multi-variable algorithm for "best solution/limited decision time" selection of the work station sequence for a particular vehicle based on available next operations. The sequencing method 300 begins at the start block 302. Then, the sequencing method 300 includes continues to block 304. At block 304, the coordination server 50 receives a plurality of inputs, including: (1) a penetration ratio (i.e., model mix ratio); and (2) discrete-event simulation model target system. The "penetration ratio" represents how many vehicle models (i.e., model production volume) will be made during the assembly process. The discrete-event simulation model is a simulation model of the assembly process that can include parameters that are dynamically updated to represent the current operating condition of the process, thus allowing the results to be adaptive to actual conditions. At block 306, the coordination server 50 generates batch sequences by varing the batch size. The sequence method 300 then proceeds to block 308. At block 308, the coordination server 50 finds two sequences by running the simulation inputted at block 304. Next, the sequencing method 300 continues to block 310. Block 310 represents a genetic algorithm, which is a loop and determines the most efficient jobs per hour (JPH). The loop runs the genetic algorithm until the JPH cannot be improved anymore. The genetic algorithm is run by the coordination server 50 and includes step 310a, which entails selecting the best result sequences in the previous generation as a parent sequence. To select the best result sequences, the coordination server 50 selects the best two from the population. The selection criteria is JPH, wherein the larger JPH is, the better the performance is. This JPH is also called "fitness." In other words, if a sequence has a high fitness, the sequence's JPH is high. Then, the genetic algorithm (at block 310) proceeds to step 310b. Step 310b entails cross-over parent sequences and populates offspring sequences forming new generation while meeting the penetration ration constraints. To cross-over the parent sequences, the coordination server 50 procures offspring by crossing over the two best parent sequences stochastically. Next, the genetic algorithm (at block 310) proceeds to step 310c. Step 310c entails making mutations in the new generation. To make this mutation, the coordination server 50 produces offspring by crossing over the population stochastically. Then, the generation algorithm proceeds to step 310d. Step 310d entails evaluating JPH of sequences in the new generation by running the simulation. After block 310, the sequencing method 300 continues to block 312. At block 312, the coordination server 50 outputs the best sequence (i.e., the output sequence). The coordination server 50 also communicates the best sequence to the skid controller 34. The skid controller 34 then controls the movement of the partially assembled BEV 12 in accordance with the output sequence. Then, the sequencing method 300 ends at block 314.

While the best modes for carrying out the teachings have been described in detail, those familiar with the art to which this disclosure relates will recognize various alternative designs and embodiments for practicing the teachings within the scope of the appended claims. The autonomous vehicle guidance system and method illustratively disclosed herein may be suitably practiced in the absence of any element and/or step which is not specifically disclosed herein. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings.

The invention claimed is:

1. An autonomous vehicle guidance system, comprising:
   a partially assembled battery-electric vehicle (BEV) including:
   a vehicle body;
   a vehicle controller coupled to the vehicle body;
   a vehicle battery electrically coupled to the vehicle controller;
   a sensor skid configured to be coupled under the vehicle body of the BEV, wherein the sensor skid is configured to guide the partially assembled BEV through an assembly process, wherein the sensor skid includes:
   a skid body configured to be coupled under the vehicle body of the partially assembled BEV;
   a plurality of sensors coupled to the skid body, wherein each of the plurality of sensors is configured to detect objects around the partially assembled BEV; and
   a skid controller in communication with the plurality of sensors and the vehicle controller, wherein the skid controller is coupled to the sensor skid and is programmed to communicate with the vehicle controller to guide a movement of the partially assembled BEV based on data received from the plurality of sensors;

wherein the skid controller is programmed to determine whether the partially assembled BEV is at a last work station of an assembly process;

wherein the skid controller is programmed to upload a final process data to a coordination server and to prepare to disconnect the sensor skid from the partially assembled BEV in response to determining that the partially assembled BEV is at the last work station of the assembly process.

2. The autonomous vehicle guidance system of claim 1, wherein the plurality of sensors includes a camera configured to capture images of areas around the partially assembled BEV.

3. The autonomous vehicle guidance system of claim 2, wherein the plurality of sensors includes a laser projector configured to project a visible light onto a plant floor around the partially assembled BEV.

4. The autonomous vehicle guidance system of claim 3, wherein the sensor skid includes a skid battery electrically connected to the skid controller and the plurality of sensors, the skid battery is configured as a power supply that supplies electricity solely when the vehicle battery fails, the vehicle battery is electrically connected to the skid controller and the plurality of sensors, the sensor skid includes a power connection coupler to electrically connect the vehicle battery to the plurality of sensors and the skid controller, the plurality of sensors includes a plurality of laser range scanners to detect an operator that is within a predetermined distance from the partially assembled BEV, each of the plurality of laser range scanners is configured to generate laser-sensing data, the skid controller is programmed to receive the laser-sensing data, each of the plurality of laser range scanners is configured to establish a virtual bumper to detect the operator that is within the predetermined distance from the partially assembled BEV, the skid controller is programmed to detect that the operator is within the virtual bumper based on the laser-sensing data received from the plurality of laser range scanners, the skid controller is programmed to command the partially assembled BEV to stop in order to avoid contact with the operator that is within the virtual bumper in response to detecting that the operator is within the virtual bumper.

5. The autonomous vehicle guidance system of claim 4, further comprising a plurality of pins coupled to the sensor skid, wherein each of the plurality of pins is configured to engage the vehicle body of the partially assembled BEV in order to couple the sensor skid to the partially assembled BEV, and the sensor skid is removably coupled to the partially assembled BEV.

6. The autonomous vehicle guidance system of claim 5, wherein the sensor skid includes a plurality of skid wheels coupled to the sensor skid to facilitate movement of the sensor skid for coupling with the partially assembled BEV, the partially assembled BEF includes a plurality of vehicle wheels coupled to the vehicle body, the autonomous vehicle guidance system further includes a skid transceiver coupled to the skid body, the skid transceiver is coupled to the skid controller to establish a wireless communication between the skid controller and the coordination server, the autonomous vehicle guidance system further includes an electrical energy receiver configured to receive energy from an opportunity charging station, the electrical energy receiver is coupled to an underside of the skid body to facilitate energy transfer between the opportunity charging station and the vehicle battery and the skid battery, and the partially assembled BEV includes a vehicle transceiver configured to establish a wireless communication with the sensor skid and the coordination server via a wireless network.

7. A sensor skid for guiding a partially assembled battery-electric vehicle (BEV) through an assembly process, the sensor skid comprising:

a skid body configured to be coupled under a vehicle body of the partially assembled BEV;

a plurality of sensors coupled to the skid body, wherein each of the plurality of sensors is configured to detect objects around the partially assembled BEV; and a skid controller in communication with the plurality of sensors, wherein the skid controller is coupled to the sensor skid, the skid controller is programmed to receive sensing data from the plurality of sensors, and the skid controller is programmed to guide a movement of the partially assembled BEV based on the sensing data received from the plurality of sensors; and wherein the skid controller is programmed to determine whether the partially assembled BEV is at a last work station of an assembly process;

wherein the skid controller is programmed to upload a final process data to a coordination server and to prepare to disconnect the sensor skid from the partially assembled BEV in response to determining that the partially assembled BEV is at the last work station of the assembly process.

8. The sensor skid of claim 7, wherein the plurality of sensors includes a camera configured to capture images of areas around the partially assembled BEV.

9. The sensor skid of claim 8, wherein the plurality of sensors includes a laser projector configured to project lasers onto a plant floor around the partially assembled BEV.

10. The sensor skid of claim 9, wherein the plurality of sensors includes a scanner configured to scan lasers projected onto the plant floor by the laser projector to detect at least one of the objects around the partially assembled BEV.

11. The sensor skid of claim 10, further comprising a plurality of pins coupled to the sensor skid, wherein each of the plurality of pins is configured to engage the vehicle body of the partially assembled BEV in order to couple the sensor skid to the partially assembled BEV.

12. The sensor skid of claim 11, further comprising a plurality of wheels coupled to the sensor skid to facilitate movement of the sensor skid.

13. The sensor skid of claim 12, further comprising a Wi-Fi transceiver coupled to the sensor skid, wherein the Wi-Fi transceiver is coupled to the skid controller to establish a wireless communication between the skid controller and a coordination server.

14. The sensor skid of claim 13, further comprising an electrical energy receiver configured to receive energy from an opportunity charging station.

15. The sensor skid of claim 14, wherein the electrical energy receiver is electrically coupled to a vehicle battery of the partially assembled BEV.

16. The sensor skid of claim 15, wherein the opportunity charging station is one of a wireless inductive charging station and a conductive charging station.

17. An autonomous vehicle guidance method, comprising:

mechanically and electrically coupling a sensor skid to a partially assembled battery-electric vehicle (BEV), wherein the sensor skid configured to guide the partially assembled BEV through an assembly process, the sensor skid including a plurality of sensors coupled to the sensor skid, each of the plurality of sensors being configured to detect objects around the partially assembled BEV, the sensor skid further includes a skid controller in communication with the plurality of sensors, the skid controller is coupled to the sensor skid and is programmed to guide a movement of the partially assembled BEV based on data received from the plurality of sensors, the partially assembled BEV includes a vehicle body and a vehicle controller coupled to the vehicle body;

syncing the skid controller with the vehicle controller;

sending, by the skid controller, a message to a coordination server, wherein the message indicates that the partially assembled BEV is ready for an operation;

in response to receiving the message, the coordination server responds with a list of available work stations;

determining a target work station of the list of available work stations;

in response to determining the target work station, commanding the partially assembled BEV to move toward the target work station;

determining, by the skid controller, whether the partially assembled BEV is at a last work station of an assembly process;

uploading, by the skid controller, a final process data to a coordination server and preparing to disconnect the sensor skid from the partially assembled BEV in responde to determining that the partially assembled BEV is at the last work station of the assembly process.

18. The autonomous vehicle guidance method of claim 17, further comprising implementing an agent-based dynamic job scheduling method to select the partially assembled BEV that will be serviced next by a work station using a following equation:

$$\underset{i \in S_j}{\text{Max}} \{C_{(i,j)} - C_{(O_j,j)}\}$$

where:
i is the partially assembled BEV in an assembly process;
j is the work station in the assembly process;
$S_j$ is a service request queue of the work station j in the assembly process;
$O_j$ is the partially assembled BEV currently being served in the work station j;
$C_{(i,j)}$ is the cycle time of the partially assembled BEV i in the work station j; and
$C_{(O_j,j)}$ is the cycle time of the partially assembled BEV currently being served $O_j$ in the work station j.

19. The autonomous vehicle guidance method of claim 18, wherein the target work station is determined by using an adaptive vehicle sequencing multi-variable algorithm, wherein the method further comprises detecting, by the sensor skid, the vehicle controller, a propulsion system of the partially assemble BEV, and a vehicle battery of the partially assembled BEV after mechanically and electrically coupling the sensor skid to the partially assembled BEV, the method further includes determining, by the skid controller, whether the partially assembled BEV is located at a last work station of an assembly process, the method further includes uploading final process data to the coordination server in response to determining that the partially assembled BEV is located at the last work station of the assembly process, and the method further comprises preparing to disconnect the sensor skid from the partially assembled BEV in response to determining that the partially assembled BEV is located at the last work station of the assembly process.

20. The autonomous vehicle guidance method of claim 19, wherein the sensor skid includes a Wi-Fi transceiver coupled to the sensor skid, wherein the Wi-Fi transceiver is coupled to the skid controller to establish a wireless communication between the skid controller and the coordination server, the method further comprises performing checks to determine whether the vehicle controller and the skid controller are operating according to predetermined operational conditions, the method further comprises determining whether the checks are in accordance with predetermined parameters, wherein the skid sensor sends the message to the coordination server in response to determining that the checks are in accordance with predetermined parameters.

* * * * *